May 28, 1957 J. W. BROWN ET AL 2,793,987
SHORT TIME REACTIONS IN THE CONVERSION OF HEAVY
HYDROCARBON OILS WITH SOLID PARTICLES
Filed April 1, 1952 3 Sheets-Sheet 2

James W. Brown  Inventors
Charles E. Jahnig
By L. F. Marx  Attorney

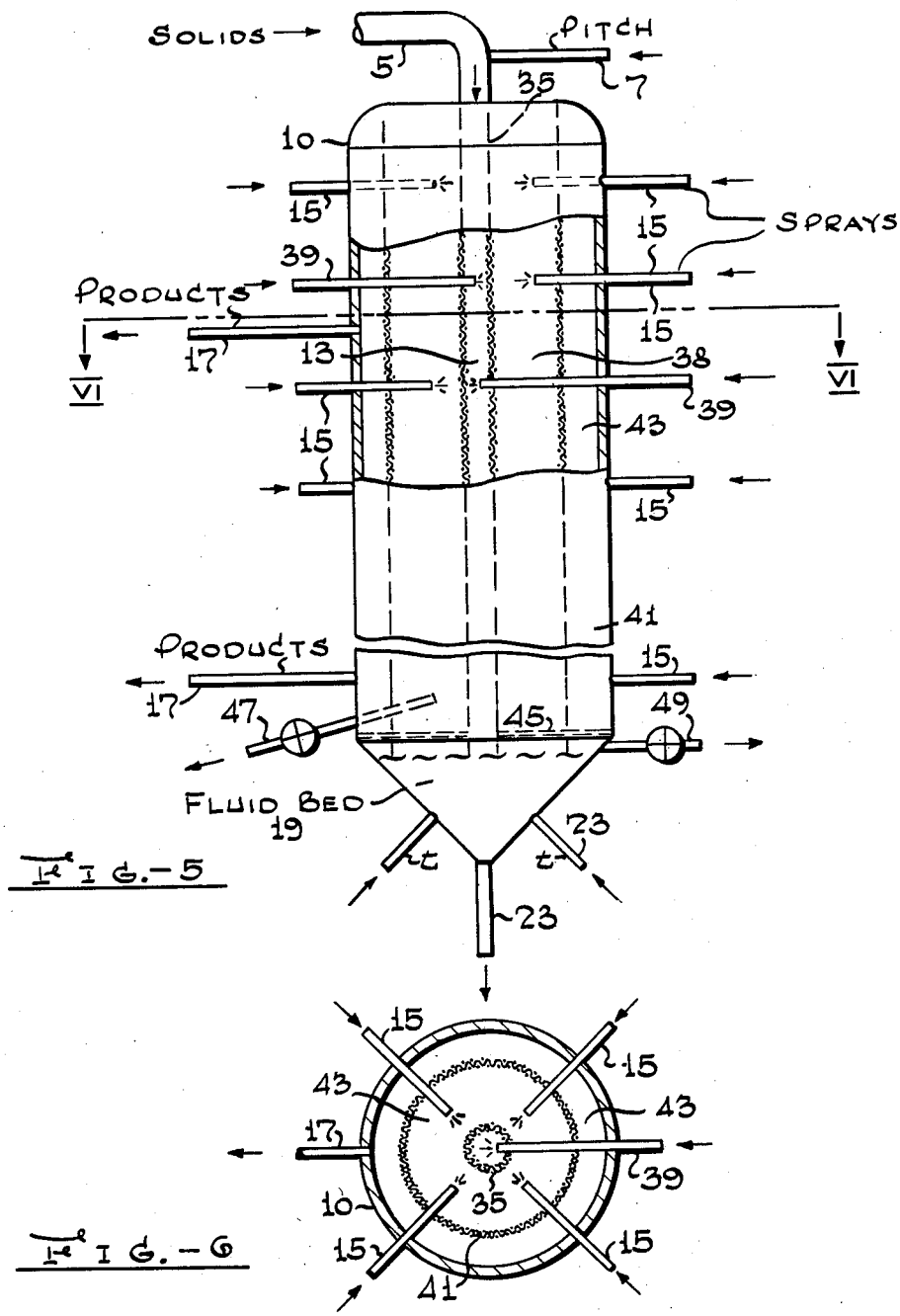

United States Patent Office 2,793,987
Patented May 28, 1957

2,793,987

SHORT TIME REACTIONS IN THE CONVERSION OF HEAVY HYDROCARBON OILS WITH SOLID PARTICLES

James W. Brown, Elizabeth, and Charles E. Jahnig, Red Bank, N. J., assignors to Esso Research and Engineering Company, a corporation of Delaware Application April 1, 1952, Serial No. 279,882

4 Claims. (Cl. 196—55)

The present invention relates to a method of contacting fluids with solids. More specifically, the invention pertains to short time reactions promoted by contacting fluids with subdivided solids wherein the reaction time is controlled by controlling the contact time between solids and fluids.

In its broadest aspect, the invention provides for intimately mixing fluids with subdivided solids, passing the mixture downwardly through a contacting zone at conditions adapted to produce fluid reaction products and passing a fluid transversely to the downwardly moving mixture of fluids and solids through the contacting zone. In this manner, a cross-current of fluid sweeps across the falling solids stream, thereby quickly removing from the contacting zone fluid reaction products as they are formed. The invention has particular utility in the conversion of heavy hydrocarbonaceous materials, such as whole crudes, topped or reduced crudes, tars, pitches, heavy cycle stocks including clarified oil, etc., in intimate contact with heat-carrying subdivided solid contact materials to form lower boiling hydrocarbon oils, particularly of the gas oil and gasoline range and/or valuable raw materials for chemical processes, such as olefins, diolefins, aromatics, and other chemicals.

Prior to the present invention, heavy hydrocarbonaceous materials have been converted in the presence of heat-carrying subdivided solids, such as coke, sand, pumice, clay, silica gel, kieselguhr, etc., which act as heating medium and coke carrier and prevent the deposition of coke on equipment walls. For the production of motor fuels the coking process is preferably conducted at conditions conducive to the production of predominantly gas oil range hydrocarbons suitable as feed stocks for catalytic cracking operations. The reason for this is the superior quality of catalytically cracked gasoline as compared with gasoline derived from thermal cracking operations.

High temperatures and, particularly, long contact times are conducive to high conversions, that is, the formation of excessive proportions of thermally cracked gasoline, gas and coke at the expense of the more desirable gas oil range hydrocarbons. However, high temperatures coupled with short contact times yield desirable proportions of gas oils together with small amounts of a high quality gasoline.

Also, the production of chemicals, such as unsaturated and aromatic hydrocarbons from feed stocks of the type mentioned above, requires high reaction temperatures for the formation of these compounds and extremely short contact times at these temperatures to prevent destruction of the desirable compounds by over-cracking. High-temperature, short-time contacting between highly heated subdivided solids and hydrocarbon residues, therefore, is of considerable importance in petroleum refining.

Heavy oils may be cracked by mixing the same with a stream of hot finely divided coke to vaporize the oil at least partially while forming a suspension of solids in oil vapors, and passing this stream through a conduit or transfer line at a high velocity and for a short time to effect mild cracking. The solid and gasiform products are passed into conventional gas-solids separation means and from there to any further desired treatment. This type of operation permits low conversions at temperatures as high as 1100° F. by reducing the vapor residence time to about one second.

However, the residual oil feed contains a variety of constituents varying widely in cracking resistance. The more refractory of these constituents will, therefore, not be cracked or will even remain unvaporized while others are converted within the short contact time provided and should be immediately removed before they are excessively cracked.

When the transfer line effluent is passed to conventional gas-solids separation means, such as a cyclone separator, cracking of the uncracked feed constituents deposited on the solids continues. However, at the same time the cracking products likewise undergo further cracking within the cyclone and its solids discharge line at the high temperatures prevailing therein. At least the latter effect is undesirable in most cases.

Some of the difficulties mentioned above may be avoided by operating in stages, i. e., by continuously removing product vapors from the solids and quenching the vapors while allowing further cracking time for the unconverted feed. Separated solids are reheated in a burner vessel, usually after soaking and stripping, and then returned to the reaction zone. In the separation of solids from vapors in several successive conventional separators, such as cyclones, several seconds time is required for a separation to take place and for the solids to be introduced into subsequent reaction zones. Frequently, however, the time between separation stages should be less than one second. For example, at high temperatures of, say, 1200°–1400° F. the time should be of the order of 0.1 second. The present invention overcomes these difficulties.

It is, therefore, the principal object of the present invention to provide improved means for preventing over-treatment of reactants or reaction products in the short-time contacting of fluids with subdivided solids.

A more specific object of the invention is to crack heavy oils in contact with heat-carrying solids without over-cracking of desirable cracking products. Other objects and advantages will appear from the description of the invention hereafter wherein reference will be made to the accompanying drawing, in which:

Figure 5 is an illustration similar to that of Figure 1 of another embodiment of the invention; and Figure 6 is a top plane view of the contacting vessel of Figure 5.

Figure 1:
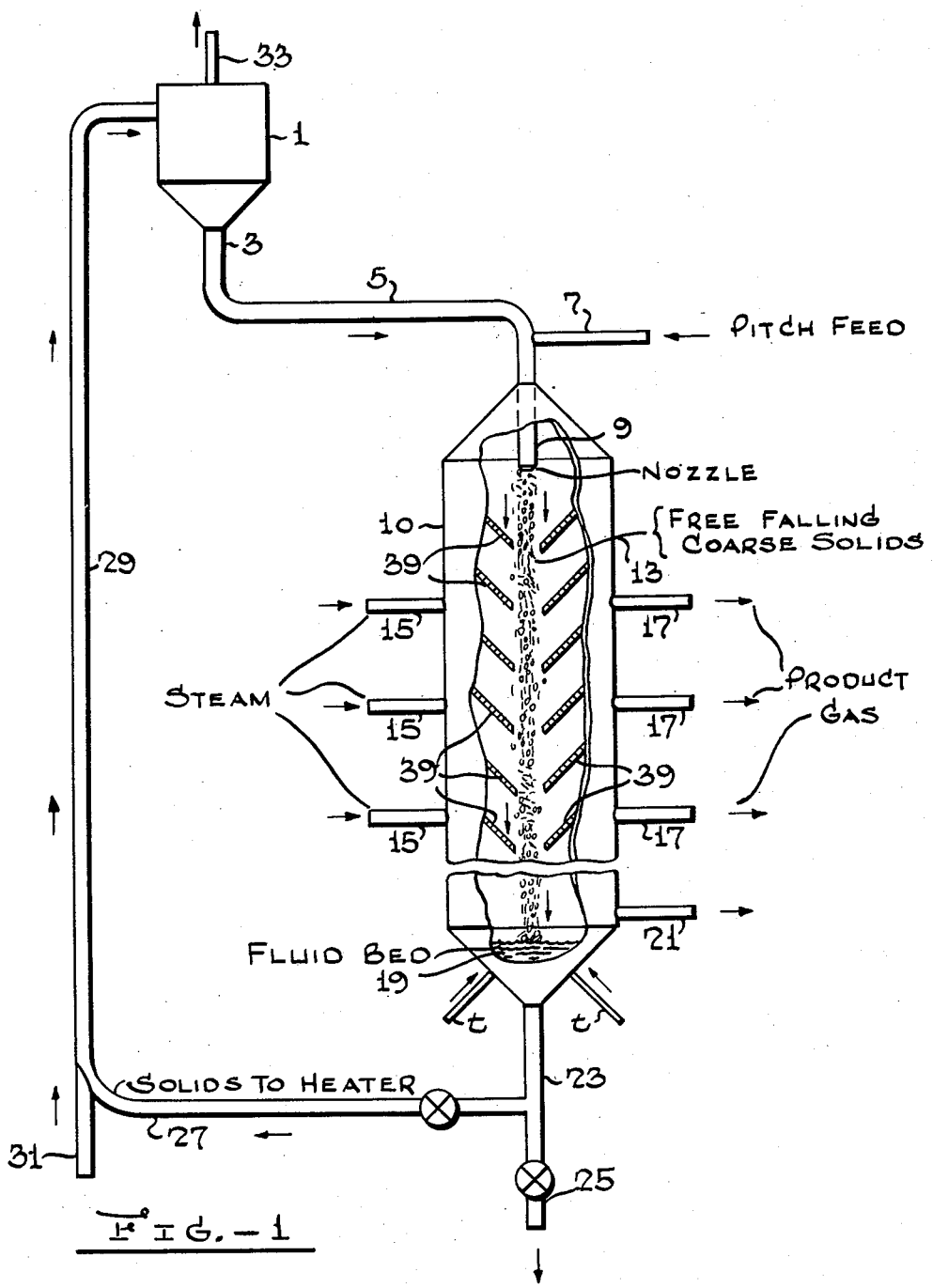
Figure 1 is a schematical illustration of equipment suitable to carry out a preferred embodiment of the invention.

In accordance with the present invention, a mixture of fluids and solids is injected downwardly into the top of a vertical reaction zone at the desired reaction conditions of temperature and pressure so that the solids pass in the form of a vertical stream downwardly through the contacting space. As gasiform reaction products are formed, the gas phase of the downwardly moving stream expands rapidly and gasiform reaction products leave the solids stream in a transverse direction and may be withdrawn in this direction from the reaction zone. This effect is preferably enhanced by passing a stream of an extraneous gasiform medium transversely through the contacting zone at a distance from the feed point of the fluid-solids mixture adequate to provide the contact time required to complete at least a portion of the desired reaction.

The transverse, preferably substantially horizontal, extraneous stream may be forced through the vertical solids stream so as to strip and remove therefrom gasiform products of reaction. If desired, the temperature of the extraneous transverse gasiform stream may be readily so controlled that the gasiform products removed by this stream are simultaneously quenched to a non-reactive temperature.

While the process of the invention contemplates a rapid removal and, in most cases, a rapid cooling of the gasiform constituents of the vertical stream flowing down through the contacting zone, it is generally undesirable to entrain appreciable amounts of solids in the transverse gas or vapor stream. Also, heat transfer between the solids of the vertical stream and the vapors or gases of the transverse stream should be maintained at a minimum in order to permit the strongest possible quenching effect on gasiform products without appreciably reducing the reaction temperature within the vertical stream itself.

It is desirable, therefore, to maintain at a maximum the momentum of the solids moving downwardly in the vertical reacting stream. This may be accomplished by injecting the solids into the top of the contacting zone at relatively high injection velocities and/or using relatively heavy solids particles, preferably particles of relatively large size. In addition, it may be desirable to provide means adapted to confine the solids stream to a predetermined path, such as may be defined by a vertical cylindrical screen permeable to gases but impermeable to the solids, suitable other baffle arrangements, etc.

When applying the process of the invention to the coking or cracking of heavy hydrocarbonaceous materials, such as whole or reduced crudes, heavy cycle or clarified oils or the like, heat-carrying subdivided solids are preheated to a temperature not below and preferably substantially above, say, about 50°–200° F. above, the desired coking or cracking temperature. The liquid feed is sprayed onto the hot solids in a ratio adequate to heat the oil feed to the desired reaction temperature and to maintain the solids carrying the oil at this temperature for the time required to complete the desired reaction.

The solids carrying unvaporized oil feed are injected together with vaporized feed constituents at a high velocity downwardly into the top of a vertical contacting zone to form a rapidly falling well defined vertical stream of solids and vapors therein. A stream of steam, hydrocarbon gas, flue gas, or the like, is preferably injected through a side wall of the contacting zone so as to pass transversely through the contacting zone and to be withdrawn therefrom together with product gases and vapors. The temperature and velocity of this more or less horizontal stream are preferably substantially lower than those of the vertical solids stream.

More than one of these transverse streams may be passed through the contacting zone at different levels spaced over the height of the contacting zone. In this manner, reaction products of different characteristics may be withdrawn at different levels.

In many cases it may be desirable to quench additionally by injecting a spray of liquid toward the falling reacting solids. Thus, droplets of liquid water, naphtha, etc, may be sprayed in from the sides, and the droplets evaporate as they travel through the hot product gases which are thereby quenched. The vaporized quench liquid and reaction products flow toward the wall and are withdrawn.

Solids suitable for cracking heavy hydrocarbonaceous residues include inerts, such as various metals, particularly stainless steel, coke, sand, various clays, etc. However, solids having catalytic cracking activity, such as activated natural or synthetic clays, synthetic gels of the silica-alumina or silica magnesia type, etc., may likewise be used. Depending on their specific gravity, these materials may be employed initially in particle sizes ranging from about 100 to about 10,000 microns, the particle size being the larger the lighter the material and vice versa. Solids injection velocities at the entrance of the reaction vessel of about 10 to 150 ft. per second are normally suitable to establish the desired conditions. At these conditions the horizontal gas stream may be passed through the contacting zone at linear velocities of about 1 to 30 ft. per sec.

Since carbon is deposited on the solids in the course of the cracking or coking reaction, the solids withdrawn from the bottom of the contacting zone may be readily reheated to the desired injection temperature by combustion of their carbon deposits in a separate combustion zone. This may be accomplished in dense phase fluid type, dilute suspension phase or moving bed type of operation in any conventional manner.

Having set forth its objects and general nature, the invention will be best understood from the following description of a specific application wherein reference will be made to the drawing.

Referring now in detail to Figure 1 of the drawing, the system shown therein will be described using the high temperature thermal cracking of a reduced crude to form low boiling unsaturated hydrocarbons including aromatics as an example. It should be understood, however, that the system may be used for low temperature coking of the same or similar feed stocks as well as for other purposes in a generally analogous manner.

In operation, hot metal particles having an average size of about 100 to 500 microns are withdrawn from cyclone separator 1 through line 3 at a temperature of about 1300° to 1800° F. The hot solids are injected into pipe 5 at a linear velocity of about 1 to 60 ft. per second. This may be accomplished by building up sufficient head of solids above the injection point that 1 to 50 lbs. per sq. in. pressure drop can be provided for accelerating and moving solids in line 5.

A reduced crude, such as West Texas vacuum pitch or a similar material which may be preheated to a temperature of about 400° to 900° F. is sprayed via line 7 into line 5 and onto the hot solids. The feed ratio of the reduced crude should be such as to establish an average temperature of the mixed contents of pipe 5 of about 1200° to 1400° F. At this temperature, a substantial portion of the oil feed is vaporized, the remainder being deposited on the hot solids.

This vaporization involves a considerable increase in volume which causes a corresponding increase in the velocity of the mixture in the vertical section 9 of pipe 5. The result is that the solids-vapor mixture is injected from pipe section 9 into the top of contacting vessel 10 at a relatively high velocity of about 10 to 150 ft. per second. The solids fall down through vessel 10, forming therein as a result of their high momentum a fairly compact vertical solids stream 13 of a well defined limited cross-sectional area.

Immediately upon contact with the hot solids in pipe section 9, the vaporized oil feed as well as the unvaporized constituents deposited on the solids begin to crack into lower molecular weight hydrocarbons of a relatively high degree of unsaturation. This cracking reaction continues on the downward path of the solids through vessel 10. Product vapors and gases pass continuously from the solids stream into the surrounding space of vessel 10. However, a substantial portion of the vapors and gases is carried along by the high velocity solids stream. Simultaneously, product coke is formed on the carrier solids. Vessel 10 should be long enough to provide for a total travelling time of the solids from its top to its bottom zone of about 0.1 to 20 seconds. A vessel height of about 10 to 50 ft. is usually adequate for this purpose.

In order to prevent overcracking, the desired cracked unsaturated hydrocarbons must be removed from contact with the hot solids within a time not exceeding 1 second and preferably within a time of about 0.1–0.5 second after their formation. For this purpose, steam is injected through a side wall of vessel 10 toward stream 13 in a substantially horizontal direction through a plurality of lines 15 arranged in spaced relationship and distributed over the height of vessel 10. The steam should be injected at a temperature of about 300° to 800° F. in such a manner as to establish a transverse gas velocity in vessel 10 of about 1 to 20 ft. per second and exert a quenching effect adapted to maintain the vapors removed from stream 13 at a temperature of about 400° to 1000° F.

A mixture of product vapors and gases with steam is withdrawn through lines 17 which may be located at points diametrically opposite the feed points of lines 15. Lines 17 may correspond in number to that of feed lines 15. However, the diameter of lines 17 should be larger than that of lines 15 to accommodate the increased gas volume without substantially increase in velocity. The contents of lines 17 may be passed to conventional product recovery equipment (not shown) including fractionation, adsorption, polymerization, alkylation and other refining facilities.

Since the products recovered from vessel 10 at different levels differ in character, separate recovery of two or more streams is, in many cases, desirable. For example, products removed from the upper section will be rich in olefins and paraffin hydrocarbons while those removed from the lower section will be relatively high in aromatic and dry gas content.

Coke-carrying solids which may still be at a temperature of about 1200° to 1400° F. are collected in the conical bottom portion 19 of vessel 10. In this portion the solids are retained for about 10 to 1000 seconds. Occluded product gases and extraneous steam provide sufficient aeration to maintain the solids in a readily flowing condition. Small amounts of steam may be injected through taps to provide turbulence and strip the solids of valuable gasiform products which may be removed through line 21. The additional residence time in zone 19 at temperatures conducive to cracking is designed to complete cracking of the most refractory feed constituents deposited on the solids.

Stripped solids now consisting essentially of metal shot and product coke are removed via line 23 from zone 19. Excess solids may be withdrawn from the system via line 25. The remainder of the solids is passed via line 27 to a combustion zone 29 in which they are suspended in a combustion-supporting gas, such as air, supplied through line 31. Carbon is burned off the solids to an extent and at conditions adapted to reheat the solids to their desired charge temperature of 1300° to 1800° F. Combustion zone 29 may have the form of a simple transfer line in which gases and solids flow upwardly at a relatively high velocity of, say, about 10–100 ft. per second without appreciable back-mixing of solids against suspending gases. Suspension densities of about 0.1–10 lbs. per cu. ft. may be established in zone 29.

The total hot effluent of zone 29 is discharged into a gas-solids separation system illustrated by cyclone separator 1. Flue gases are withdrawn through line 33 and hot solids are returned to reactor 10 via lines 3 and 5 as described above.

Figure 2:
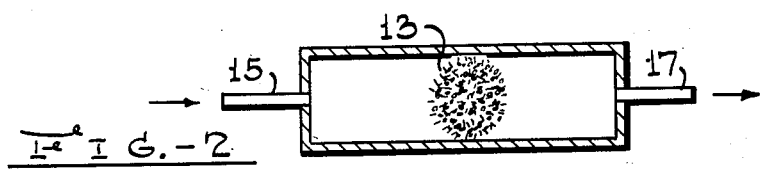
Figures 2–4 illustrate modifications of the contacting vessel of Figure 1 in horizontal sectional views.

The system illustrated in Figure 1 permits of various modifications. Regarding the shape of vessel 10, an essentially rectangular cross-section is preferred to obtain the maximum cross-flow velocity with a given amount of gas injected through lines 15. This modification is schematically illustrated in the cross-sectional view of Figure 2. In this case, the diameter of solids stream 13 should not be substantially smaller than the width of vessel 10 in a direction perpendicular to the flow of the extraneous gas. Preferably, the diameter of stream 13 should be about 70 to 100% of this width. It will be understood, of course, that such deviations from a rectangular shape as shapes tapering toward the vertical small sides of the vessel, for example shapes having curved cross-sections, such as elliptical cross-sections, may be used to increase mechanical strength of the structure.

Figure 3:
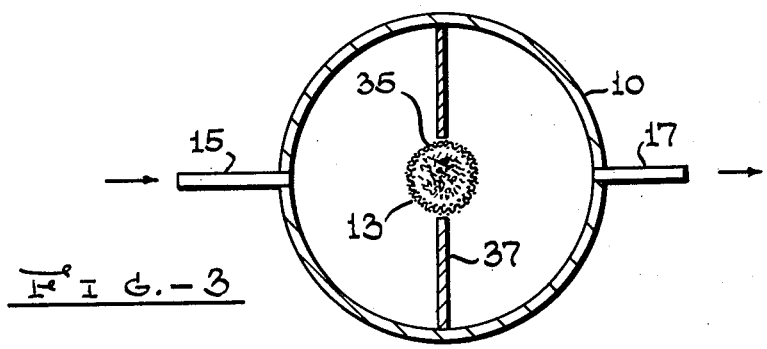

Reactor 10 may be of cylindrical rather than rectangular shape. In this case, baffles may be used both to confine the area of falling solids and to reduce by-passing of cooling gas around stream 13. For example, as shown in Figure 3, pipe section 9 may discharge into a cylindrical vertical baffle or screen 35 permeable for gases but impermeable for solids and forcing all solids into a confined vertical downward path. A vertical baffle 37 may be used to force the stripping and quenching gas through stream 13.

Also, substantially funnel-type baffles 39 (see Figure 1) may be used within vessel 10 in the presence or absence of screen baffle 35 to concentrate the flow of the cooling fluid on its transverse path toward stream 13. These latter funnel baffles may be vertical but, preferably, are slightly inclined and spaced so that they will not be plugged by solids. The spaces may be about ¼ to 3" or more between baffles 39. These baffles allow gas to escape free of solids by change of direction, even if no screen 35 is used.

Figure 4:
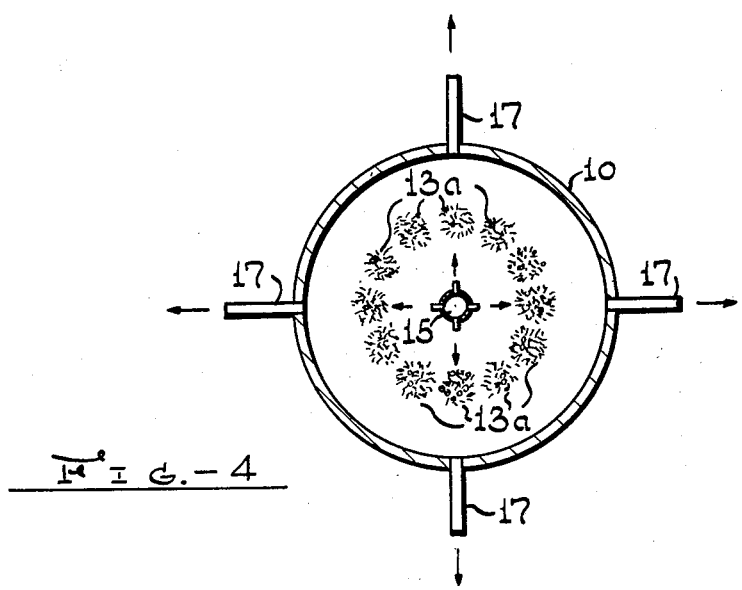

A further modification using a cylindrical contacting vessel is illustrated in Figure 4. Here the solids stream 13 is split into a plurality of smaller streams 13a distributed in an annular pattern so as to form in essence a cylindrical solids stream. The stripping and cooling gas is introduced from the interior of the cylindrical solids stream through lines 15. The mixture of gasiform products and extraneous gas is withdrawn from the periphery of vessel 10 through any desired number of lines 17.

Instead of steam, hydrocarbon gas may be injected for stripping and cooling. It may also be desirable to inject low boiling liquids, such as water, liquid hydrocarbons, low boiling product, etc. instead of, or in addition to, the gas supplied through lines 15, particularly in cases in which an extremely strong quenching effect is desired. Cooling fluids may be injected into vessel 10 by means of fog nozzles with mechanical or liquid atomization using water or liquid hydrocarbons. Lines 15 may feed into vessel 10 from one or more sides. Product gas and/or liquid or even liquid feed may be injected through lines 15.

If desired, additional oil feed, such as heavy recycle stock, from the product recovery system may be added to zone 19 to be cracked therein to high conversion for the production of specialty products, such as resin raw materials, solvent naphtha, etc.

While a transfer line combustion zone is shown in the drawing, it will be understood that other techniques may be used for this purpose, depending to a certain extent on the particle size of the solids. For example, at particle sizes of about 50 to 1000 microns the transfer line heater is suitable, or it may be combined with a dense phase fluid-type combustion zone which may take the place of cyclone 1. With larger particles, the packed moving bed type of combustion zone may be used in combination with a gas lift or bucket conveyors.

The embodiment of the invention described with reference to Figures 1–4 of the drawing is particularly useful whenever it is desirable to pass an extraneous stripping and cooling fluid through the downflowing stream of solids and vapors. While best results with respect to stripping efficiency are obtained in this manner, it may be adequate in many cases to maintain the downflowing solids stream at a relatively high suspension density and to quench immediately the gasiform products emerging from the solids stream into the surrounding contacting vessel. A system adapted to carry out this type of operation is illustrated in Figures 5 and 6.

Referring now to Figures 5 and 6, the design and operation of the system shown therein are generally similar to those of Figures 1 and 3 except for such differences as are specifically outlined below. Like reference numbers are used to identify like system elements. Certain identical elements, particularly the solids reheating and feeding means, have been omitted for the sake of brevity.

In operation, hot solids are introduced via line 5 and reduced crude, pitch or the like is sprayed on the solids from line 7. The combined solids and hydrocarbon feed stream is injected from pipe 5 into a vertical cylindrical screen 35 of the type described above with reference to Figure 3. Screen 35 should be so dimensioned that the solids stream acquires a suspension density such that the gas volume does not exceed, say, about 70%, being preferably maintained between about 40 and 60%, of the total volume of stream 13. The mesh of the screen should be fine enough to prevent sticking of solids particles therein.

As the solids fall down through screen 35, cracking and, with it, expansion of the gas phase in stream 13 take place. Cracked vapors and gases emerge from stream 13 through screen 35 into the surrounding free space 38 of vessel 10. These gasiform products are quenched immediately upon their discharge from screen 35 by the cooling fluid injected through pipes 15.

In contradistinction to Figures 1 and 3, however, the cooling fluid is injected from all directions through pipes 15 arranged in the form of a concentric bank of pipes or fluid injection points as appears more clearly in Figure 6. The result is strong turbulence in free space 38 and extremely rapid and efficient quenching of the products entering space 38 from stream 13. While some of the volatile cracking products will be carried along by the solids stream and may thus be subject to overtreating, the proportion of such products is relative small due to the relatively high density of the solids stream. Normally at least 80% and frequently at least 90% of the gases and vapors produced in stream 13 are expelled therefrom into space 38 within a time of less than 1 second at the conditions here described. However, if desired, a diluent gas such as steam, hydrocarbon gas, flue gas, etc., may be introduced directly into stream 13 via lines 39 further to reduce the residence time of the gasiform products in stream 13.

The withdrawal of the mixed gases and vapors should be uniform from all portions of space 38. That is, the formation of quiescent pockets alternating with high velocity vapor streams flowing toward the discharge points should be avoided. For this purpose, a second substantially cylindrical screen baffle 41 may be arranged adjacent to but spaced from the walls of vessel 10. An annular space 43 is formed in this manner from which the mixed gases and vapors may be withdrawn through one or more lines 17 while maintaining a uniform pressure drop across the entire area of baffle 41 so as to accomplish uniform flow conditions in space 38.

The solids are finally collected in fluid bed 19 to be further treated as outlined with reference to Figure 1.

In some cases it may be desirable to increase the quenching effect of the fluids supplied via lines 15 by introducing subdivided solids of a suitably low temperature into space 38 either alone or together with the fluids through lines 15 or in separate streams. These solids may be non-catalytic and of a type similar to those of stream 13 or they may have a catalytic effect, e. g. cracking or reforming activity, which may exert itself in space 38 or in subsequent treatments of the products. Particularly in the latter case, these quench solids may be of sufficiently small particle size to remain entrained in the vapor-gas mixture in space 38 and to be withdrawn therewith through lines 17.

In accordance with another modification of the use of quench solids, the latter may be maintained in space 38 in the form of a dense highly turbulent fluidized mass or even in the form of a compact downwardly moving bed. In this case, catalytic reactions may be carried out in space 38 to any desired degree. The mass of quench solids in space 38 may be supported and separated from fluid bed 19 by a suitable substantially horizontal baffle 45 arranged just above bed 19 in a manner obvious to those skilled in the art. Separate lines 47 and 23 for the withdrawal of solids from space 38 and bed 19, respectively, and a separate gas withdrawal line 49 for bed 19 will be provided in this case. A similar arrangement may be used when it is desired to permit the quench solids freely to fall downwardly through space 38.

It will be appreciated that such solids constitute, in any case, an efficient quench medium because they may be circulated at a high weight rate and heat may be effectively recovered therefrom, for example in a steam boiler.

While reactions involving the formation of gasiform products from liquids in stream 13 have been described, it is noted that the principles of the invention are also applicable to processes for converting solid feed into reaction products which are liquid at the reaction conditions. In these cases, preferably low-viscosity liquid stripping and cooling fluids should be used to remove the liquid product from the falling stream of heat-carrying solids.

The cracking of heavy hydrocarbonaceous feed stocks has been chiefly referred to above and this is the principal utility and preferred application of the invention. However, various other uses may suggest themselves to those skilled in the art. Quite generally, the invention has utility in all cases in which such treatments are carried out in contact with subdivided solids as involve an increase in mobility of the materials being treated whereby the products tend to escape from the contact solids and wherein short contact times are required. For example, catalytic dehydrogenation, cracking of light petroleum fractions, cracking of residuum to give catalytic cracking feed, or cracking hydrocarbons at 1600°–2000° F. to produce acetylene, may be carried out in a manner generally analogous to that described with reference to the drawing.

Application of the invention to fields other than hydrocarbon reactions include various cracking, oxidation and reduction processes requiring careful control of reaction time to avoid undesirable secondary reactions. For example, the oxidation of various alcohols to aldehydes and/or acids on solid oxidizing agents such as copper oxide or other metal oxides may be carried out to advantage in accordance with this invention so as to avoid overoxidation to undesired products.

Systems of the type described herein may also be adapted to the distillation of many materials which tend to decompose when exposed to their atmospheric boiling point for any substantial length of time. In other words, such systems may take the place of vacuum or molecular stills by substituting an extremely short heating time for a high vacuum. Such materials may be injected into the top of the contacting zone together with a solids stream heated above the boiling point of the material and transverse quench and stripping streams may be supplied as above described to shorten the distillation time as desired.

The above description and exemplary operations have served to illustrate specific embodiments of the invention. It will be understood that the invention embraces such other variations and modifications as come within the spirit and scope thereof.

What is claimed is:

1. In the process of converting heavy hydrocarbonaceous residues into volatile products in contact with hot subdivided solids supplying the heat required for conversion; the step of controlling the contact time of said products with said solids, which comprises intimately mixing said residues with a sufficient proportion of said solids to maintain the mixture at a temperature conducive to the formation of said products in the gasiform state, then passing the mixture as a well defined free-falling stream downwardly through a conversion zone, said stream having a terminal velocity of 10 to 150 ft./sec. gasiform products escaping continuously from said stream along its downward path through said zone into a free space adjacent to said stream and confined by said zone, unconverted feed being retained in said stream, passing a plurality of streams of an extraneous gasiform medium having a temperature substantially lower than said mixture temperature through said zone and at least partly through said mixture stream in a direction transverse to the flow direction of said mixture stream so as to quench said escaping products and strip said mixture stream of gasiform products within a time not exceeding 1 second from the formation of said vapors, said extraneous streams being introduced at points spaced along the flow path of said mixture stream, and withdrawing mixtures of quenched gasiform products and extraneous medium from said space at a plurality of points spaced along the flow path of said mixture stream.

2. The process of claim 1 in which the solids of said mixture stream are collected in the bottom of said zone in the form of a dense turbulent fluidized bed providing an extended solids residence time at conversion conditions.

3. The process of claim 1 in which solids carrying carbonaceous deposits are withdrawn from the bottom of said zone and reheated by combustion at least to said first-named temperature to be reused for said conversion.

4. A process for the conversion of heavy hydrocarbonaceous materials which comprises the steps of: admixing a heavy hydrocarbonaceous feed stock with a confined, vertical, flowing stream of high temperature subdivided solids, the temperatures of said solids and of said feed stock being sufficient to maintain the resulting admixture at a temperature in the range of 1200 to 1400° F.; then passing said admixture downward at a terminal velocity in the range of 10 to 150 ft./sec. through a vertically elongated reaction zone as a free-falling vertical stream having a well defined limited cross-sectional area; collecting solids from said admixture in a reservoir in the lower portion of said reaction zone, the time of travel of the solids in said admixture through said reaction zone to said reservoir being in the range of 0.1 to 20 seconds; passing a fluid quench medium having an initial temperature in the range of 300 to 800° F. through a plurality of vertically spaced inlets into said reaction zone transverse to said free-falling vertical stream; stripping and quenching vapors from said free-falling stream with said quench medium within a time not exceeding one second from the formation of said vapors; recovering said vapors and quench medium at a temperature in the range of 400 to 1000° F. through a plurality of vertically spaced outlets from said reaction zone; stripping and removing solids from said reservoir; reheating the solids so removed; and recycling the solids so reheated to repeat the process.

References Cited in the file of this patent
UNITED STATES PATENTS

| | | |
|---|---|---|
| 1,450,327 | Meischke-Smith | Apr. 3, 1923 |
| 1,522,480 | Allen | Jan. 13, 1925 |
| 2,336,639 | Rollman | Dec. 14, 1943 |
| 2,492,998 | Lassiat | Jan. 3, 1950 |
| 2,626,205 | Watson | Jan. 20, 1953 |